Feb. 25, 1958  H. H. RAYMOND  2,824,634
MAGNETIC FLUID DEVICE WITH COOLING MEANS
Filed Sept. 7, 1950
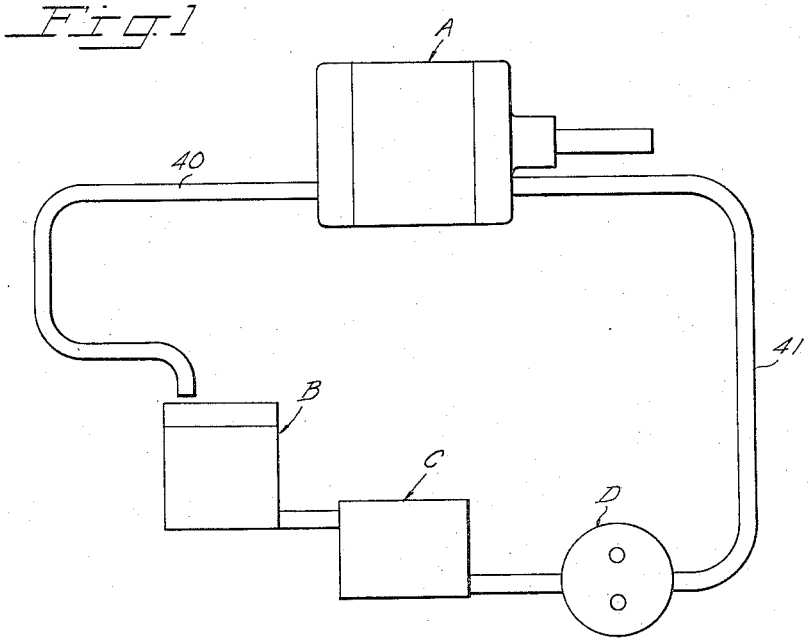
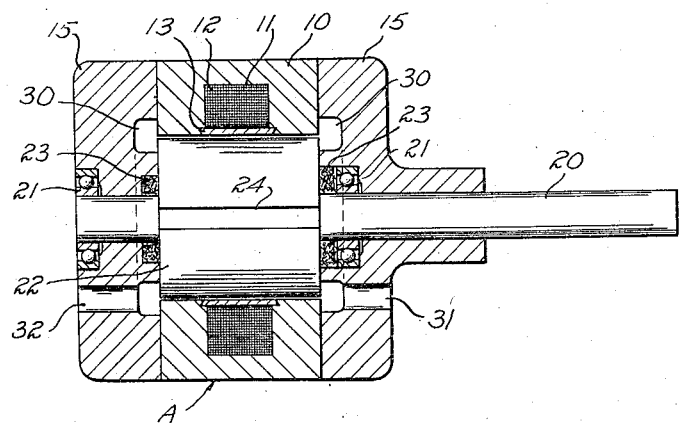
Inventor
HORACE H. RAYMOND
By
Lindsey and Prutzman
Attorneys

United States Patent Office 2,824,634
Patented Feb. 25, 1958

2,824,634

MAGNETIC FLUID DEVICE WITH COOLING MEANS

Horace H. Raymond, Berlin, Conn., assignor to Raymond Engineering Laboratory, Inc., Middletown, Conn., a corporation of Connecticut Application September 7, 1950, Serial No. 183,590

15 Claims. (Cl. 192—21.5)

The present invention relates generally to magnetic fluid brakes and clutches and more particularly to means for rendering such devices capable of absorbing large amounts of energy without overheating or failure from other causes.

The present invention relates to clutch and brake devices of the type wherein a flux path is created between two relatively movable members separated by a fluid dispersion of fine magnetizable particles such as carbonyl iron particles. In such devices a torque is created by reason of the formation of numerous chains of the magnetizable particles extending between the members as a result of the magnetic flux path therebetween. If one of the members is held stationary while the other is revolving, as in the case of a brake, or if the driving member is revolving faster than the driven member, as in the case of a slipping clutch, heat is generated in the fluid by reason of the breaking of these chains. It has been found by experiment that temperature associated with the breaking of these chains is so high as to cause carbonization or breakdown of the oils and greases ordinarily used as a fluid carrier of the magnetizable particles, even where the clutch is cooled externally by water jacketing. Furthermore, if heat continues to be generated, the overall temperature of the clutch rises to the point where the coil, bearings and seals become damaged. Accordingly, the capacity for absorbing energy and hence the practical applications of such devices has been greatly limited heretofore.

The object of the present invention is to provide a magnetic fluid brake or clutch in which the heat produced therein can be efficiently and rapidly dissipated so that the capacity of the device is vastly increased permitting the device to function over long periods of time under heavy slip loads without undesirable increase in temperature, or breakdown.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

Fig. 1 is a diagrammatic view of a cooling system employed with a magnetic fluid brake or clutch constructed in accordance with the present invention; and Fig. 2 is a longitudinal cross-sectional view of a magnetic fluid brake constructed in accordance with the present invention to permit use of the cooling system.

For simplicity of presentation, the invention will be described principally in connection with a magnetic fluid brake, inasmuch as a brake is of more simple construction in that it requires only a single movable member, but it will be apparent that the same construction may be applied to a magnetic fluid clutch, the principle of operation being the same in both cases.

Referring to the drawings, there is shown a magnetic fluid brake generally designated at A, which for the most part is of conventional construction. The central portion of the stator or housing is composed of a ring 10 of magnetic material, such as soft iron or so-called Swedish iron having the property of retaining low residual magnetism, which is formed with an annular internal channel 11 for the reception of a conventional field coil 12 composed of a plurality of turns of wire extending circumferentially within channel 11. By reason of the location of the coil 12 and the form of the ring 10, it will be appreciated that when electrical energy is applied to the coil, the portions of the ring 10 on opposite sides of the coil 12 will develop negative and positive magnetic poles, respectively. In order to enclose the coil 12, an annular ring 13 of non-magnetic material such as stainless steel or brass is pressed into the inner face of the ring 10 across the channel 11, thereby forming a fluidproof compartment for the coil 12 without at the same time providing a short circuiting magnetic flux path between the poles of the magnetized ring 10.

The ring 10 is supported between generally circular end plates 15 which may be secured thereto in any suitable manner, and which function to close off the ends of the ring 10 so as to form a fluidproof cylindrical cavity within the ring 10.

A shaft 20, which is journaled in the end plates 15 and preferably supported therein by anti-friction bearings 21, has secured thereto a cylinder 22 composed of magnetic material of small residual magnetism, such as soft iron or so-called Swedish iron. The cylinder 22 substantially fills the cylindrical cavity within the ring 10 except for a predetermined small clearance therebetween. By reason of the position of the cylinder 22 and the form of the ring 10, it will be apparent that a magnetic flux path will be produced when the coil 12 is energized which extends from one side of the coil 12 across the gap between the ring 10 and the cylinder 22, thence in an axial direction through the cylinder 22 and returning across the gap to the opposite side of the coil 12.

In order to render the brake capable of operation, a fluid or flowable dispersion of fine magnetizable particles, such as carbonyl iron particles, is introduced into the cylindrical cavity so as to fill the gap between the cylinder 22 and the ring 10. Suitable oil seals 23 may be provided about the shaft 20 in the end plates 15 to prevent leakage of the fluid along the shaft.

A magnetic fluid brake or clutch to the extent described above is representative of the devices of this type constructed in accordance with the prior art. The essential elements of such a clutch or brake are two relatively rotatable members having a small gap therebetween and means for providing a magnetic field through the gap. The relatively rotatable members may be cylindrical as shown in the drawings or may be in the form of face to face disks or in any other form utilized in the art. The magnetic field may be induced by a coil as shown or by one or more permanent magnets if preferred.

In such prior art devices, the particular fluid dispersion of fine iron particles utilized has generally been a dispersion in mineral oil or grease, sealed within the brake or clutch housing. As mentioned above, however, the operation of the brake or clutch while energized and slipping, that is when there is relative angular motion between the driving and the driven member, produces heat in proportion to the amount of torque developed and the speed of rotation which, when large amounts of power are involved, caused a rapid rise of temperature in such prior art devices. Attempts have been made to cool the housings by air and by circulating liquid in water jackets, but the areas contacted by the cooling media are relatively remote from the magnetic fluid gap by reason of the fact that said gap must be surrounded by a considerable mass of iron in order to produce the necessary flux path. The temperature in the gap is very high in comparison to the temperature of the housing and breakdown of the fluid results. Many attempts have been made heretofore to provide an oil, grease, or dry powder lubricant for use with the carbonyl iron particles which will not eventually carbonize, oxidize, dry out, cake, evaporate or leak out past the seals, under the conditions of operation referred to, but all such attempts have been unsuccessful.

In accordance with the present invention, I have overcome the disadvantage of prior art magnetic fluid brakes and clutches by devising a construction permitting a circulation of the fluid in which the iron particles are dispersed so that the fluid may be externally cooled and thus prevent the temperature of the clutch or brake from rising unduly, thereby vastly increasing the capacity of the clutch or brake to absorb power while slipping.

In accordance with the invention, I have formed the end members 15 with internal annular collector grooves 30 disposed adjacent the ends of the gap between the cylinder 22 and the ring 10, and I have provided an inlet opening 31 communicating with the annular groove 30 of one of the end plates 15 and an outlet opening 32 communicating with the annular groove 30 of the opposite end plate 15.

As best shown in Fig. 1 of the drawings, I then connect a cooling system to the inlet and outlet openings 31 and 32. As shown diagrammatically in Fig. 1, the outlet opening 32 may be connected by a tube 40 to a reservoir B, which is connected at its lower end to a heat inter-changer C, which in turn is connected to a pump D, connected in turn by conduit 41 to the inlet opening 31 of the magnetic fluid clutch or brake. Accordingly, by operation of the pump D, a continuous flow of liquid may be introduced into the magnetic fluid clutch or brake through the opening 31 and returned through the outlet opening 32. By proper design of the cooling system, shown diagrammatically in Fig. 1, it will be apparent that almost any amount of heat may be dissipated from the fluid dispersion.

I have found that such a circulating system, however, cannot be used with a magnetic fluid clutch or brake constructed in accordance with the prior art having the usual clearance between the cylinder 22 and the ring 10. When it is attempted to cause a flow of the liquid dispersion of iron particles between the cylinder 22 and ring 10 of such a magnetic fluid clutch or brake, the back pressure rapidly builds up to a point where circulation greatly diminishes and eventually stops altogether. This appears to result because the use of a circulation system requires a relatively large volume of the fluid dispersion containing the iron particles and the inherent operation of the magnetic fluid clutch or brake is to concentrate the iron particles in the gap between the cylinder 22 and ring 10. Since the circulation of the fluid through the gap increases the amount of iron particles available to the gap and the action of the magnetic flux path extending between the ring 10 and the rotor 22 is such that it tends to retain the iron particles, apparently the concentration of iron particles in the gap rapidly builds up to such an extent that it completely blocks the gap and prevents the passage of fluid therethrough. Immediately upon this happening and, assuming that the clutch or brake is being operated under conditions of high energy slip, the heat is no longer dissipated and the object of cooling by circulating the fluid is defeated.

In accordance with the present invention, I have devised a means for overcoming this inherent action of the magnetic fluid clutch or brake which consists in providing a fluid passageway in the face of one of the relatively movable members of the brake or clutch in communication laterally throughout with the gap separating the two members. In the embodiment shown in the drawing, the passageway may be provided by a slot 24 extending in an axial direction in the periphery of the cylinder 22. The slot 24 is made of sufficient size so that the flux path occurring at the slot is so diminished in intensity that the blocking action above referred to is avoided. Accordingly, as the cylinder 22 is rotated, the slot 24 has a scavenging effect upon the gap, permitting flow of fluid between the opposite collector rings 30. With such a slot provided in the cylinder, it has been found that a continuous flow of liquid can be pumped into the inlet opening 31 and released outwardly through the outlet opening 32 over long periods of time without any clogging of the system.

For simplicity of description, the slot 24 has been shown as extending in a straight line and axially of the inner member, although it will be appreciated that the same could be varied in direction or curved, or similarly modified without departing from the invention, it being necessary only that the slot shall communicate with the gap substantially entirely thereacross. It is also within the contemplation of the invention that by proper disposition of the slot 24, such as by forming it in a diagonal or spiral fashion, the rotation of the member containing the slot will produce a pumping action which would assist in the circulation of the fluid through the clutch or brake and which, in some installations, might render the use of an exterior pump D unnecessary.

The cross-sectional size of the slot 24 will be relative and will depend, for example, on such variables as the strength of the magnetic field utilized and the size of the clutch or brake. By way of specific example, one commercial embodiment of a magnetic fluid brake constructed in accordance with the present invention having a $\frac{1}{32}''$ gap between the cylinder 22 and ring 10 is provided with a slot 24 which is $\frac{1}{2}''$ square in cross section.

It is an advantage of the present invention that the desired scavenging action necessary to permit the passage of fluid through the brake or clutch may be accomplished in many instances by a single slot 24. Additional slots may be utilized if desired, and normally will be advantageous where the clutch or brake is of large diameter and/or the relative rotation is slow. Although the use of additional slots 24 will decrease somewhat the effective braking area, this may be readily overcome by a compensating increase in the size of the clutch or brake.

Inasmuch as a magnetic fluid brake or clutch constructed in accordance with the present invention can be operated without any material rise in temperature, I have made the unexpected discovery that it is unnecessary to rely on the use of the relatively expensive and less readily available oil or grease carrier materials used heretofore with their inherent disadvantages. In fact, the magnetizable iron particles such as carbonyl iron particles may be dispersed in a carrier consisting essentially of water. I have found that carbonyl iron particles of the size for this use, namely about four to fifteen microns in diameter will easily disperse in water without the necessity for any dispersing agents. Furthermore, such iron particles apparently will not rust in the dispersion, although it is within the scope of the invention to utilize a conventional rust inhibitor, if desired. The concentration of the iron particles may be very small and of the order of .005%, but the exact percentage of iron particles present does not appear to be critical. In general, the desired amount of iron may be easily determined by adding small quantities of the iron to the fluid dispersion until no material increase in braking or clutching power is obtained for the particular magnetic field strength being utilized.

Water is very efficient as a dispersant for the iron particles because it will absorb approximately twice as much heat as oil within a given temperature range and it can be circulated and cooled in accordance with the invention to keep the temperature range within safe limits.

In conventional non-circulating clutches or brakes temperatures frequently exceed safe limits and, in any event, water could not be used because it would be quickly changed to steam resulting in failure of the brake or clutch. Water, of course, will not burn or oxidize in any way or otherwise change its character in use and any evaporation or leakage can be replaced by suitable additions to the reservoir B.

In conventional clutches or brakes of this type the magnetic fluid is sealed in and a very high concentration of carbonyl particles is required. When the brake or clutch heats up, expansion or vapor pressure, or both, forces the fluid past the seals so that there is a substantial loss of volume and fluidity which in short time renders the clutch or brake inoperable. As compared therewith, the clutch or brake of my invention is not under internal pressure, the amount of fluid available is unlimited, and the iron concentration at the gap is always kept at an optimum by the inherent action of the gap even though the remainder of the dispersion in the system is dilute.

It might be mentioned that inasmuch as the iron particle concentration in the gap is greater than in the rest of the fluid system it may be preferred to shut off the flow of fluid through the clutch or brake when the coil is de-energized, thus avoiding flushing out of the concentrated iron particles and a consequent time lag in response of the clutch or brake when the coil is reenergized. This can be accomplished in any convenient way and may be performed automatically, if desired, by the use of a solenoid valve suitably connected to the electrical circuit of the coil.

By way of specific example of the use of the present invention I have been able to construct a fluid brake, for example, which is of the order of 6" square in outer dimensions and which, when operated with an electrical input to the magnetic coil of only about 25 watts, will absorb as much as 10 horsepower in continuous operation over indefinite periods of time without an increase in temperature of more than about 7 degrees F. measured at the point where the fluid emerges from opening 32. Accordingly, there has been provided in accordance with the invention a magnetic fluid brake or clutch having a capacity for working under slip-load conditions which is phenomenally greater than that of any existing brakes or clutches of similar size.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a device of the character described, an outer member formed with a cylindrical cavity therein, an inner member mounted co-axially in the cavity for rotation relative to the outer member, said inner and outer members having a gap therebetween and said inner member being formed with a longitudinal liquid passageway in its outer surface communicating transversely throughout the gap, means for producing a magnetic flux between the inner and the outer member, a reservoir, a dilute dispersion of iron particles in water in said reservoir, and means for circulating the dispersion from the reservoir through said cavity and passageway, whereby the iron particles are available to provide linkages along the flux lines interconnecting the outer and inner members and the water provides a carrier for the particles and a cooling medium for the device.

2. In a device of the character described, having an outer member formed with a cylindrical cavity therein, an inner member mounted co-axially in the cavity for rotation relative to the outer member, and means for producing a magnetic flux between the inner and the outer member, and a liquid dispersion in the space between the cylinder and the outer member consisting essentially of a suspension of fine iron particles in water, the iron particles providing linkages interconnecting the outer and inner members along the flux lines and the water providing a carrier for the iron particles and a cooling medium for the device.

3. In a device of the character described, a pair of co-axial members mounted for relative rotation and having a small gap therebetween, means for producing a magnetic flux across the gap, means having an inlet and outlet for respectively directing a flow of liquid toward and away from said gap, means forming a slot in the surface of one of the members facing the gap and communicating transversely throughout with the gap, a reservoir, a dilute aqueous dispersion of small iron particles in said reservoir, a heat interchanger, and means including a pump for circulating the aqueous dispersion from the outlet through the reservoir and heat interchanger to the inlet and thence through the slot and gap to the outlet, the iron particles of the dispersion providing linkages interconnecting said members across the gap when said magnetic flux is present and the water providing a carrier for the particles and a cooling medium for the device.

4. In a device of the character described, a ring of magnetic material, a pair of plates at opposite ends of the ring for enclosing the space within the ring, a shaft rotatably journaled in at least one of said plates and extending axially therethrough, a cylinder of magnetic material between the end plates and secured to the shaft for rotation therewith relative to the ring, said cylinder being of such size as to provide a relatively small annular gap between the cylinder and the ring and having in a segment of its periphery a longitudinal slot extending from end to end providing a relatively deep separating space at said slot, means for producing a magnetic field in the gap between the cylinder and ring, a liquid dispersion of small magnetizable particles in the gap, and means for circulating the liquid dispersion of small magnetizable particles through the slot and said last-named gap, whereby the particles provide linkages interconnecting the ring and cylinder and the liquid provides a carrier for the particles and a cooling medium for the device.

5. In a device of the character described, a ring of magnetic material, means for closing the ends of the ring, a cylinder of magnetic material within the ring of smaller diameter than the interior diameter of the ring to form a relatively narrow gap therebetween and having a longitudinal slot in a segment of its peripheral surface forming a relatively deep separation between the ring and cylinder along the slot extending transversely throughout the gap, means for mounting the cylinder for rotation relative to the ring, a field coil supported by the ring for producing a magnetic field across the gap between the ring and cylinder, a liquid dispersion of iron particles in the gap, and means for circulating the liquid dispersion of iron particles through said slot and gap, whereby the particles provide linkages interconnecting the ring and cylinder and the liquid provides a carrier for the particles and a cooling medium for the device.

6. In a device of the character described, a ring of magnetic material, means for closing the ends of the ring, a cylinder of magnetic material disposed within the ring and of smaller diameter than the inside diameter of the ring to provide an annular gap therebetween, means for mounting the cylinder for rotation relative to the ring, a field coil supported by the ring for producing a magnetic field across the gap between the ring and cylinder, and a suspension of small iron particles in water contained in said gap, whereby the iron particles provide aligned linkages under the influence of said field interconnecting the ring and cylinder and the water provides a carrier for the iron particles and a cooling medium for the device.

7. In a device of the character described, a ring of magnetic material, means for closing the ends of the ring, a cylinder of magnetic material disposed within the ring and of smaller size than the ring to provide an annular gap therebetween, said cylinder being formed with a longitudinal slot in its outer surface extending transversely throughout the gap, means for supporting the cylinder for rotation relative to the ring, a field coil associated with the ring for producing a magnetic field across the gap between the ring and cylinder, a reservoir, a water dispersion of small iron particles in said reservoir, and means for circulating the dispersion from said reservoir through the slot and the gap between the ring and cylinder, whereby the iron particles provide aligned linkages under the influence of said field interconnecting the ring and cylinder and the water provides a carrier for the iron particles and a cooling medium for the device.

8. In a device of the character described, a ring of magnetic material, means for closing the ends of the ring, a cylinder of magnetic material disposed within the ring and of smaller size than the ring to provide a relatively narrow annular gap therebetween, said cylinder being formed with a longitudinal slot in a segment of its peripheral surface facing the gap and providing a relatively deep separation between the ring and cylinder along the slot transversely throughout the gap, means for supporting the cylinder for rotation relative to the ring, a field coil associated with the ring for producing a magnetic field across the gap between the ring and cylinder, a reservoir, a liquid dispersion of small iron particles in said reservoir, a heat interchanger, and means for circulating the dispersion from said reservoir through the heat interchanger and through the slot and the gap between the ring and cylinder, whereby the particles provide linkages interconnecting the ring and cylinder and the liquid provides a carrier for the particles and a cooling medium for the device.

9. In a device of the character described, a pair of coaxial members mounted for relative rotation and having a relatively narrow gap therebetween of substantially uniform cross-section, magnetizing means for producing a magnetic flux between the members across the gap, a fluid dispersion of fine magnetizable particles in the gap, circulating means for circulating the fluid dispersion of fine magnetizable particles through the gap, said particles providing linkages interconnecting the relatively movable members across the gap when the magnetizing means is energized and the fluid providing a carrier for the particles and a cooling medium for the device, and means for permitting the fluid to circulate when the magnetizing means is energized comprising a slot in a segment of the peripheral surface of one of the members facing the gap and extending across the gap transversely of the direction of rotation of the members, said slot producing a relatively deep separation between the members along the slot and providing a zone of reduced magnetic flux.

10. A device as recited in claim 9 wherein the fluid dispersion of fine magnetizable particles consists essentially of a dispersion of iron particles in water.

11. In a device of the character described, an outer member formed with an enclosed cylindrical cavity therein, an inner member mounted coaxially in the cavity for rotation relative to the outer member, said members being mounted with a relatively narrow gap therebetween of substantially uniform cross-section, magnetizing means for producing a magnetic flux between the members across the gap, a fluid dispersion of fine magnetizable particles in the gap, circulating means for circulating the fluid dispersion of fine magnetizable particles through the gap, said particles providing linkages interconnecting the relatively movable members across the gap when the magnetizing means is energized and the fluid providing a carrier for the particles and a cooling medium for the device, and means for permitting the fluid to circulate when the magnetizing means is energized comprising a slot in a segment of the peripheral surface of one of the members facing the gap and extending across the gap transversely of the direction of rotation of the members, said slot producing a relatively deep separation between the members along the slot and providing a zone of reduced magnetic flux.

12. In a device of the character described, a pair of coaxial members mounted for relative rotation and having a relatively narrow gap therebetween of substantially uniform cross-section, magnetizing means for producing a magnetic flux between the members across the gap, a fluid dispersion of fine magnetizable particles in the gap, a heat interchanger, means for circulating the fluid dispersion of fine magnetizable particles through the gap and the heat interchanger in sequence, said particles providing linkages interconnecting the relatively movable members across the gap when the magnetizing means is energized and the fluid providing a carrier for the particles and a cooling medium for the device, and means for permitting the fluid to circulate when the magnetizing means is energized comprising a slot in a segment of the peripheral surface of one of the members facing the gap and extending across the gap transversely of the direction of rotation of the members, said slot producing a relatively deep separation between the members along the slot and providing a zone of reduced magnetic flux.

13. A device as recited in claim 12 wherein the means for circulating the fluid dispersion through the gap and heat interchanger comprises a pump.

14. In a device of the character described, a pair of coaxial members mounted for relative rotation and having a relatively narrow gap therebetween of substantially uniform cross-section, magnetizing means for producing a magnetic flux between the members across the gap, a reservoir, a fluid dispersion of fine magnetizable particles in said reservoir, a heat interchanger, means for circulating the fluid dispersion from the reservoir through the gap and heat interchanger, said particles providing linkages interconnecting the relatively movable members across the gap when the magnetizing means is energized and the fluid providing a carrier for the particles and a cooling medium for the device, and means for permitting the fluid to circulate when the magnetizing means is energized comprising a slot in a segment of the peripheral surface of one of the members facing the gap and extending across the gap transversely of the direction of rotation of the members, said slot producing a relatively deep separation between the members along the slot and providing a zone of reduced magnetic flux.

15. In a device of the character described, a pair of coaxial members mounted for relative rotation and having a relatively narrow gap therebetween of substantially uniform cross-section, magnetizing means for producing a magnetic flux between the members across the gap, a fluid dispersion of fine magnetizable particles in the gap, circulating means for circulating the fluid dispersion of fine magnetizable particles through the gap, said particles providing linkages interconnecting the relatively movable members across the gap when the magnetizing means is energized and the fluid providing a carrier for the particles and a cooling medium for the device, and means for permitting the fluid to circulate when the magnetizing means is energized comprising a slot of generally square cross-section and approximately one-half inch in depth in the surface of one of the members facing the gap and extending across the gap transversely of the direction of rotation of the members and substantially parallel to the axis of rotation.

(References on following page)

References Cited in the file of this patent

UNITED STATES PATENTS

| | | |
|---|---|---|
| 2,263,515 | Pezzillo | Nov. 18, 1941 |
| 2,407,504 | Martin | Sept. 10, 1946 |
| 2,525,571 | Winther | Oct. 10, 1950 |
| 2,541,831 | Prince | Feb. 13, 1951 |
| 2,575,360 | Rabinow | Nov. 20, 1951 |
| 2,605,876 | Becker | Aug. 5, 1952 |
| 2,663,809 | Winslow | Dec. 22, 1953 |
| 2,690,241 | Backman | Sept. 28, 1954 |

FOREIGN PATENTS

| | | |
|---|---|---|
| 485,591 | Belgium | Nov. 13, 1948 |
| 976,917 | France | Mar. 23, 1951 |

OTHER REFERENCES

Magnetic Fluid Clutch in Servo Applications, Electronics, November 1949, pages 100–103.

Magnetic Fluid Clutch, reprint from General Electric Review, December 1949, pages 3 to 7 inclusive.